UNITED STATES PATENT OFFICE.

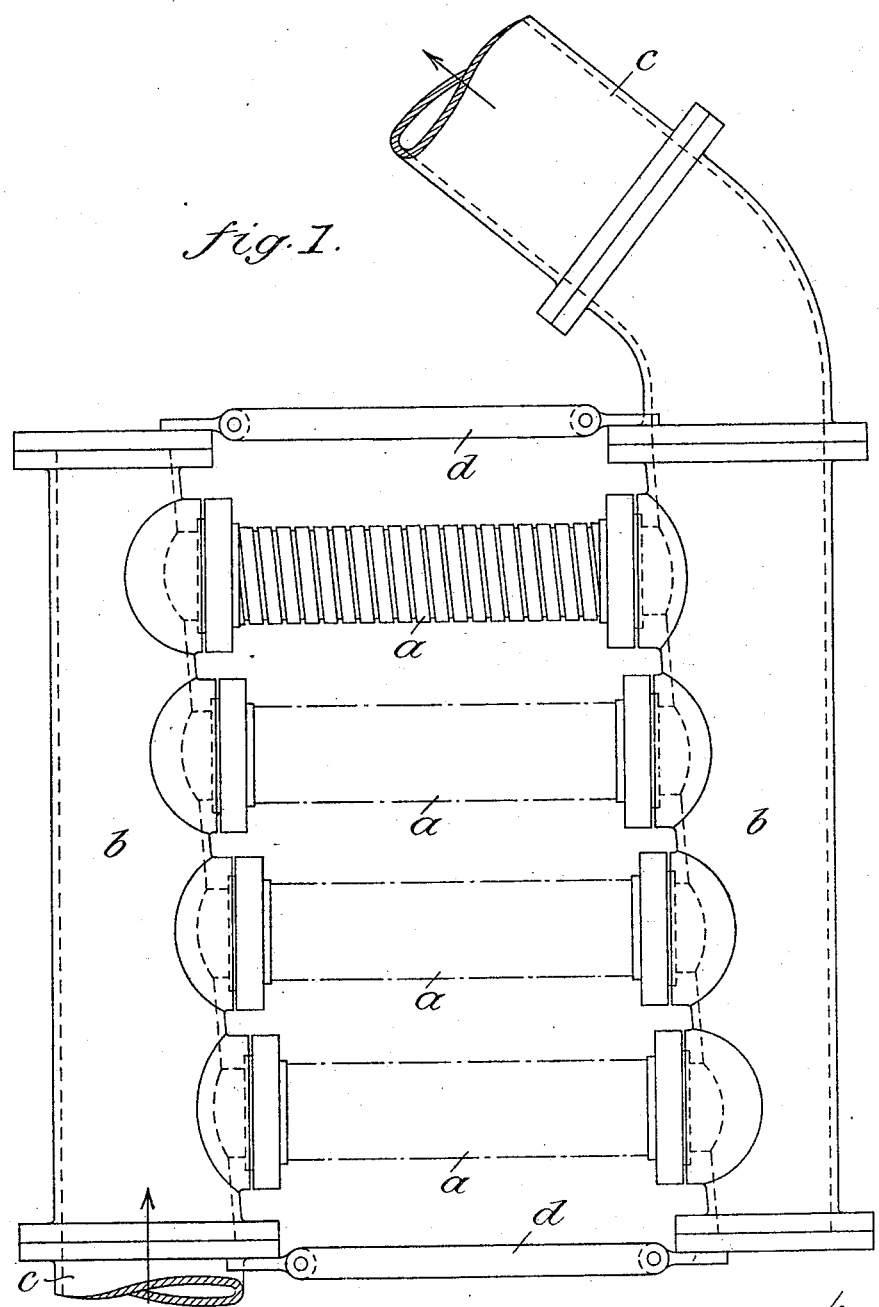

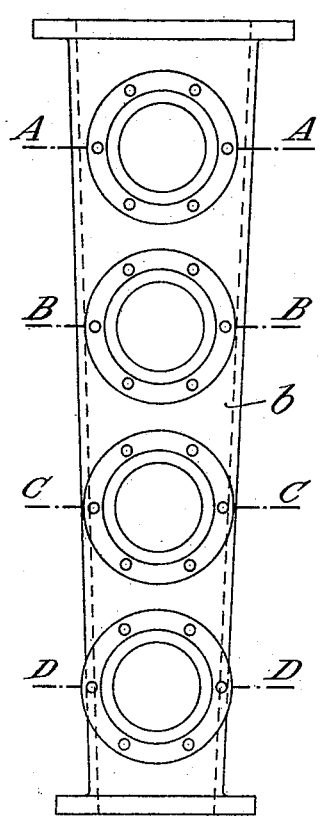
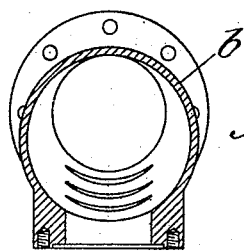
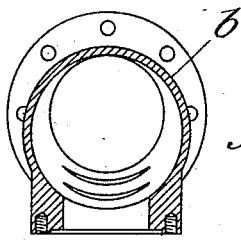
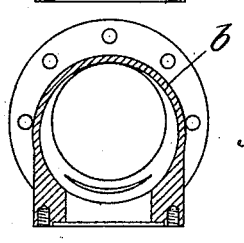
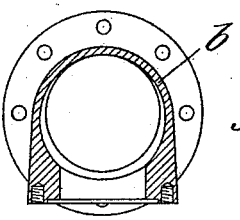

EMIL WITZENMANN, OF PFORZHEIM, GERMANY.

COMPENSATOR FOR PIPES.

No. 916,907.　　　　Specification of Letters Patent.　　　Patented March 30, 1909.

Application filed March 27, 1907. Serial No. 364,887.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Compensators for Pipes, of which the following is a specification.

My invention relates to a device whereby alterations in the length of pipes can be compensated for.

According to my invention I connect in the piping a plurality of flexible metal pipes, whose diameter is less than the bore of the former, but is such that the sum of the passages presented by the several flexible pipes gives the total section necessary for flow of the steam or the like.

This device is designed for use in those cases in which, owing to restricted space, it is not practicable to employ other contrivances, such as that disclosed in United States Patent No. 700,378. If, for instance, this latter device were to be used for piping of 300 mm. bore, metallic hose of 300 mm. diameter would have to be employed. A hose pipe of this diameter would, however, have to be of corresponding length, which would not be possible in places, such as narrow shafts, where space is strictly limited. By employing a number of flexible metal pipes of smaller diameter than that of the main piping, placed one beside the other, the length, that is the extent of lateral projection, of such flexible pipes can be kept much shorter, without the action of the compensator being affected.

Figure 1 is a side elevation of my invention. Fig. 2 is an elevation of one of the collecting-pipes. Figs. 3–6 are cross-sections on the lines A—A, B—B, C—C, D—D, of Fig. 2.

In the device shown $a$ are the various flexible metal pipes—for instance, metallic spiral hose—connecting the collecting-pipes $b$ of the piping $c$. The pipes $b$ are connected also by bars $d$ jointed to them, so that on shifting, the pipes $b$ remain parallel with each other.

As shown, the diameter of the hose pipes $a$ is less than the bore of the piping $c$, being such that the sum of the passages presented by the several hose pipes gives the total section required for the flow of the steam or the like.

The collecting-pipes $b$ are conically sloped in opposite directions, whereby the length of the hose pipes $a$ may be kept still shorter, without the action of the compensator or the free passage of steam being affected. Parallel motion of the pipes $b$ on shifting is in this modification insured by the collecting-pipes being connected at each end by a single bar $d$ jointed to them.

Having thus described my invention, I claim as new:—

In combination, length of piping, means pivotally connecting them together to insure their moving in parallelism, and a plurality of flexible metal pipes of smaller diameter than the bore of said piping, laterally connecting the adjacent portions of the latter, said lengths of piping being inversely tapered.

In witness whereof I have hereunto signed my name this 9th day of March 1907, in the presence of two subscribing witnesses.

EMIL WITZENMANN.

Witnesses:
　ERNEST ENTENMAN,
　HENRY H. MORGAN.